(12) United States Patent
Palacios

(10) Patent No.: US 9,514,181 B2
(45) Date of Patent: Dec. 6, 2016

(54) CALCULATION EXPRESSION MANAGEMENT

(75) Inventor: Angel Palacios, Madrid (ES)

(73) Assignee: LINGUAVERSAL, SL, Madrid (ES)

( * ) Notice: Subject to any disclaimer, the term of this patent is extended or adjusted under 35 U.S.C. 154(b) by 0 days.

(21) Appl. No.: 10/599,178

(22) PCT Filed: Mar. 22, 2005

(86) PCT No.: PCT/ES2005/000148
§ 371 (c)(1),
(2), (4) Date: Sep. 21, 2006

(87) PCT Pub. No.: WO2005/091702
PCT Pub. Date: Oct. 6, 2005

(65) Prior Publication Data
US 2007/0198538 A1    Aug. 23, 2007

(30) Foreign Application Priority Data

Mar. 23, 2004  (ES) .................................. P200400717
Sep. 6, 2004   (ES) .................................. P200402140

(51) Int. Cl.
*G06F 7/00* (2006.01)
*G06F 17/30* (2006.01)

(52) U.S. Cl.
CPC .............................. *G06F 17/30398* (2013.01)

(58) Field of Classification Search
CPC ................. Y10S 707/956; Y10S 707/99934; G06F 17/30932; G06F 17/227; G06F 17/10; G06F 17/30011; G06F 17/30436; G06F 17/30427
See application file for complete search history.

(56) References Cited

U.S. PATENT DOCUMENTS

| | | | |
|---|---|---|---|
| 5,421,008 A | | 5/1995 | Banning et al. |
| 5,471,613 A | * | 11/1995 | Banning et al. .................. 707/4 |
| 5,544,262 A | * | 8/1996 | Pagallo .......................... 382/189 |
| 5,559,939 A | * | 9/1996 | Wada et al. .................... 715/538 |
| 5,581,756 A | | 12/1996 | Nakabayashi |
| 5,745,878 A | * | 4/1998 | Hashimoto et al. .............. 705/1 |
| 5,911,138 A | * | 6/1999 | Li et al. ........................... 707/3 |

(Continued)

FOREIGN PATENT DOCUMENTS

| | | | |
|---|---|---|---|
| EP | 309374 A2 | * | 3/1989 |
| EP | 0616289 | | 9/1994 |

(Continued)

OTHER PUBLICATIONS

Jaekyu Ha, Robert M. Haralick, Ihsin T. Phillips, Understanding Mathematical Expression from Document Image.*

(Continued)

*Primary Examiner* — Augustine K Obisesan

(57) ABSTRACT

The invention relates to calculation expression management. In general terms, a calculation expression is a union of variables, constants, operators functions, delimiter characters and other possible elements, which can be used to product a result. A sample calculation expression is as follows: "2*3+A*(2+B+C)". The uses of calculation expressions include the creation of formulae, the formation of strings and the implementation of searches for databases. The invention facilitates the implementation of sophisticated calculation expressions. For said purpose, the invention consists in constructing and evaluating calculation expressions from graphical structures representing trees. The graphical structure scan be of various different types.

16 Claims, 20 Drawing Sheets

(56) References Cited

U.S. PATENT DOCUMENTS

| | | | |
|---|---|---|---|
| 6,263,328 B1 | 7/2001 | Coden | |
| 6,279,007 B1 * | 8/2001 | Uppala | G06F 17/30961 |
| 6,326,962 B1 | 12/2001 | Szabo | |
| 6,434,545 B1 * | 8/2002 | MacLeod et al. | |
| 6,438,741 B1 * | 8/2002 | Al-omari et al. | 707/2 |
| 6,578,028 B2 | 6/2003 | Egilsson et al. | |
| 6,610,106 B1 * | 8/2003 | Jenks | 715/538 |
| 6,637,011 B1 * | 10/2003 | Zolotykh et al. | 716/103 |
| 6,704,724 B1 * | 3/2004 | Ellmann et al. | 707/718 |
| 7,181,068 B2 * | 2/2007 | Suzuki et al. | 382/229 |
| 7,502,819 B2 | 3/2009 | Alonso | |
| 7,685,507 B2 | 3/2010 | Workman et al. | |
| 8,234,309 B2 | 7/2012 | Furukawa et al. | |
| 8,510,650 B2 | 8/2013 | Garland et al. | |
| 8,662,895 B2 | 3/2014 | Palacios Orueta | |
| 2002/0174380 A1 * | 11/2002 | Mannarsamy | 714/25 |
| 2003/0093410 A1 * | 5/2003 | Couch et al. | 707/3 |
| 2003/0110246 A1 * | 6/2003 | Byrne et al. | 709/223 |
| 2003/0177137 A1 * | 9/2003 | MacLeod et al. | 707/102 |
| 2003/0191765 A1 | 10/2003 | Bargh | |
| 2004/0024770 A1 * | 2/2004 | Cardno | 707/100 |
| 2004/0060007 A1 * | 3/2004 | Gottlob et al. | 715/513 |
| 2004/0104945 A1 * | 6/2004 | Kearns et al. | 345/853 |
| 2004/0205078 A1 * | 10/2004 | Galindo-Legaria et al. | 707/100 |
| 2004/0215599 A1 * | 10/2004 | Apps et al. | 707/2 |
| 2005/0065963 A1 * | 3/2005 | Ziemann et al. | 707/102 |
| 2005/0086208 A1 * | 4/2005 | Bestgen et al. | 707/3 |
| 2005/0097100 A1 * | 5/2005 | Galindo-Legaria et al. | 707/3 |
| 2005/0131893 A1 * | 6/2005 | Von Glan | G06F 17/30445 |
| 2006/0053363 A1 | 3/2006 | Bargh | |
| 2007/0281286 A1 | 12/2007 | Palacios | |
| 2012/0042242 A1 | 2/2012 | Garland et al. | |

FOREIGN PATENT DOCUMENTS

| | | | | |
|---|---|---|---|---|
| EP | 575358 B1 * | 7/1997 | | |
| EP | 1286276 A1 * | 2/2003 | | |
| EP | 1667034 A2 * | 6/2006 | | |
| GB | 2354849 A * | 4/2001 | | |
| WO | WO 9933003 * | 7/1999 | | |
| WO | WO 0133436 A1 * | 5/2001 | | |
| WO | WO 03107223 A1 * | 12/2003 | | G06F 17/30448 |
| WO | WO 2005024663 A1 * | 3/2005 | | |

OTHER PUBLICATIONS

Aravind K. Krishna and Amruth N. Kumar, A problem generator to learn expression evaluation in CS I, and its effectiveness.*

Stephen J. Garland, Introduction to Computer Science with Applications in Pascal, Addison-Wesley Publishing Company, Reading, MA, 1986, pp. 605-613.

* cited by examiner

FIGURE 5

| ▶ | Style=Essay AND ((Orientation=History AND NOT Year <1990) OR (Orientation=Biography AND NOT Year <1995)) AND (Topic=Business AND NOT (Topic=Accounting OR Topic=Finance) AND ((Language= English OR (Language=Frances AND Year > 2000) OR (Language=Russian AND Year > 2002)) |
|---|---|

FIGURE 6

| ▼ | Style=Essay AND ((Orientation=History AND NOT Year <1990) OR (Orientation=Biography AND NOT Year <1995)) AND (Topic=Business AND NOT (Topic=Accounting OR Topic=Finance) AND ((Language= English OR (Language=Frances AND Year > 2000) OR (Language=Russian AND Year > 2002)) |
|---|---|
| | Style=Essay |
| ▶ AND | Orientation=History AND NOT Year <1990) OR (Orientation=Biography AND NOT Year <1995 |
| ▶ AND | Topic=Business AND NOT (Topic=Accounting OR Topic=Finance) |
| ▶ AND | Language=English OR (Language=Frances AND Year > 2000) OR (Language=Russian AND Year > 2002) |

FIGURE 7

| ▼ | Style=Essay AND ((Orientation=History AND NOT Year <1990) OR (Orientation=Biography AND NOT Year <1995)) AND (Topic=Business AND NOT (Topic=Accounting OR Topic=Finance) AND ((Language= English OR (Language=Frances AND Year > 2000) OR (Language=Russian AND Year > 2002)) |
|---|---|
| | Style=Essay |
| ▼ AND | Orientation=History AND NOT Year <1990) OR (Orientation=Biography AND NOT Year <1995 |
| | ▼    Orientation=History AND NOT Year <1990 |
| |      Orientation=History |
| | AND NOT    Year < 1990 |
| | ▶ OR    Orientation=Biography AND NOT Year <1995 |
| ▶ AND | Topic=Business AND NOT (Topic=Accounting OR Topic=Finance) |
| ▶ AND | Language=English OR (Language=Frances AND Year > 2000) OR (Language=Russian AND Year > 2002) |

FIGURE 12
Acción 1
Acción 2
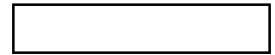
Acción 3
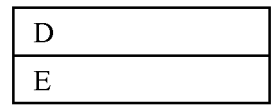
Acción 4
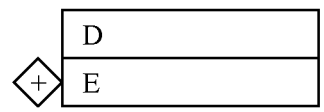
Acción 5
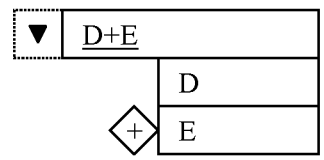
Acción 6
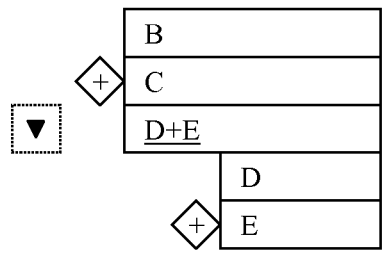
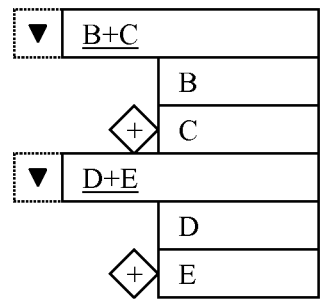

| Style=Essay |
| --- |
| Orientation=History |
| Year < 1990 |
| Orientation=Biography |
| Year < 1995 |
| Topic=Business |
| Topic=Accounting |
| Topic=Finance |
| Language=English |
| Language=French |
| Year > 2000 |

FIGURE 25

| (((A + C / (D + B)) * (F + (E * (A + (B + C) / F)))) + (G / (H * (H + I)))) * A |
|---|
| ( ) * A |
| ( ) + (G / ) |
| (A + C / ) * (F + ) (H * ) |
| (D + B) (E * ) (H + I) |
| (A + ) |
| (B + C) / F |

FIGURE 26

| (((A + C / (D + B)) * (F + (E * (A + (B + C) / F)))) + (G / (H * (H + I)))) * A |
|---|
| ( ) * A |
| ( _____ + (G / ) |
| (A + C / ) * (F + ) (H * ) |
| (D + B) (E * ) (H + I) |
| (A + ) |
| (B + C) / F |

FIGURE 27

| (((A + C / (D + B)) * (F + (E * (A + (B + C) / F)))) + (G / (H * (H + I)))) * A |
|---|
| ( ) * A |
| ( ) + (G / ) |
| (A + C / ) * (F + ) (H * ) |
| (D + B) (E * (A + (B + C) / F)) (H + I) |
| (A + ) |
| (B + C) / F |

FIGURE 44
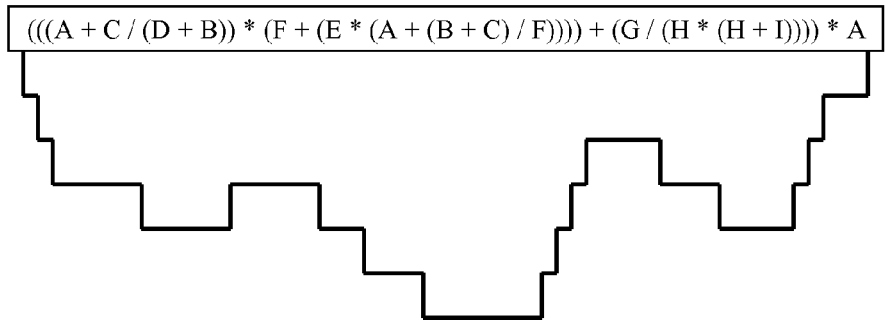
FIGURE 45
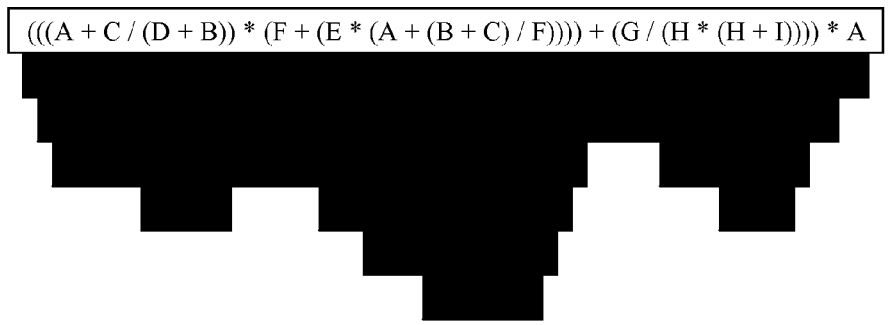
FIGURE 46
| (((A + C / (D + B)) * (F + (E * (A + (B + C) / F)))) + (G / (H * (H + I)))) * A | | | | |
|---|---|---|---|---|
| | | | | * A |
| | | | + G / | |
| A + C / | | * F + | | H * |
| | D + B | E * | | (H + I) |
| | | A + | | |
| | | (B + C) / F | | |

CALCULATION EXPRESSION MANAGEMENT

AREA

This invention falls within the area of computerized tools and methods for managing calculation expressions.

PRIOR ART

The rapid expansion of computers during the last years has caused that a high amount of people who are not computer experts are, nevertheless, computer users. This has created the need to simplify the way in which certain computerized tasks are performed.

One of these tasks is the creation of calculation expressions. In general terms, a calculation expression is a group of variables, constants, operators, functions, delimiting characters and other possible elements that can be used in order to obtain a result. Exhibit 1 shows an example of a calculation expression.

$$2*3+A*(2+B+C) \qquad \text{Exhibit 1}$$

The usual delimiting characters are parenthesis or brackets. In the most general case, there might exist different types of delimiting characters, with different properties, even though usually only one type is utilized. In this document, it is assumed that only parenthesis are used. This does not impose any restriction to the scope of the invention. In order to ease the exposition of the invention, the term ELEMENT will be used to refer to variables and constants that make up the expression. For example, in Exhibit 1, "A", "B", and "2" are elements.

Some additional concepts will be defined next. These concepts are well known to or easily understood by the person with a regular skilled in the art. They will help to define the scope of the invention.

The expression is made up of elements (which have already been defined), OPERATORS, COMPARATORS. OPERATORS are those entities such as AND, OR, +, – and so on. COMPARATORS are those entities such as <, >, = and so on. There might exist other types of operators and comparators, because the actual choice of operators and comparators is defined by the designer of the expression and/or the designer of the actual embodiment of the invention. Comparators are the basic element used for creating predicates in boolean expressions and database queries. For example, a comparator "is" is often employed in many database system. Regardless of the actual operators and comparators that are used, both operators and comparators are concepts well known by the person skilled in the art.

An ITEM is the smallest fragment of the expression that has meaning in itself. For quantitative expressions, the items would be the variables and constants used in the expression. For example, in the formula "A+3*(B+D*(F–H–J))", "A", "3", "B", "D", "F", "H" and "J" would be items. For logical formulas, the items would be the basic predicates, for example for "(Language=Spanish OR Cover=Hard) AND Theme=Novel AND NOT Theme=Essay", the items would be "Language=Spanish", "Cover=Hard", "Theme=Novel" and "Theme=Essay".

A SUBEXPRESSION is a fragment of the expression that has meaning in itself, is correctly formed, and is not the expression itself_ For example, for the previous quantitative expression, "F–H–J" would be a subexpression, but "B+D" would not, because "D" is associated to the operator and elements on its right. It must be noted that items are a type of subexpressions. In fact, items are the smallest subexpressions in an expression. It must be emphasized that in this patent application, the expression itself is not considered to be a subexpression, so all subexpressions are always smaller than the expression. In other words the expression contains all subexpressions, but no subexpression contains the expression.

An INTRODUCED SUBEXPRESSION is a subexpression to which its operators have been added. For example, "(F–H–J)" is an introduced subexpression, and "AND NOT Theme=Essay" is an introduced subexpression. To facilitate the explanation, subexpressions which are not introduced subexpressions will also be called REGULAR SUBEXPRESSIONS.

An INTERMEDIATE SUBEXPRESSION is a subexpression that is not an item. Therefore, using the terms introduced in the previous paragraph, there can exist:

INTERMEDIATE INTRODUCED SUBEXPRESSIONS, which are introduced subexpressions that are not items, and INTERMEDIATE REGULAR SUBEXPRESSIONS, which are intermediate subexpressions that are not introduced subexpressions.

The following examples clarifies the previous definitions. In the first example, the previous definitions will be exemplified for the following boolean calculation expression:

"(X>3) or (Y=0) and ((A or B) and (C and not D))"

1. Elements:
X, Y, 3, 0, A, B, C
(It must be noted that X and Y are arithmetic elements while A, B, C are logical elements.)
2. Operators:
or, and, not
3. Comparators:
>, =
4. Items
X>3, Y=0, A, B, C, D
(It must be noted that because this is a boolean expression, X does not have a meaning in itself, because it does not have a boolean value)
5. Subexpressions
Exhibit 1b shows the different types of subexpressions that can be found in the previous example expression.
Exhibit 1b.

| | |
|---|---|
| Regular subexpresions (because they are items, they are not intermediate subexpressions) | X > 3, Y = 0, A, B, C, D, |
| Introduced subexpressions (because "Y", "B" and "D" are items, these subexpressions are not intermediate subexpressions) | or (Y = 0), or B, not D, and not D, |
| Intermediate regular subexpressions | A or B, C and not D, (A or B) and (C and not D), (Y = 0) and ((A or B) and (C and not D) ), |
| Intermediate introduced subexpressions | and ((A or B) and (B and not C)), or (Y = 0) and ((A or B) and (B and not C)), |

Calculation expressions are used, specially, for building formulae and search strings. Formulae are normally used in environments such as spreadsheets, source code editors and other environments. Search strings are normally used for performing searches in databases, in Internet and in other environments.

Calculation expressions might be logical or arithmetical. There are calculation expression of very different natures. For example, there might exist expressions that simultaneously contain elements, operators and functions of different types, such as logical, arithmetical, textual etc.

It is also possible to use fragments that contain logical or arithmetical correlate, or a correlate of a different type. For example, it is possible to use comparative fragments, such as for example "Topic='Essay'", where "Topic" is a variable and "'Essay'" is a value, so that if the variable "Topic" takes the value "'Essay'", the fragment is true.

It is also possible to use variables in an implicit way, such as is normally done in Internet search engines. Using variables in an implicit manner can be done in a variety of ways. In the most general case, there might exist a character string 'XYZ' that would be computed according to certain rules that might be defined in different ways, in order to yield a 'true' or 'false' value for each entity for which the expression is evaluated. For example, in Internet search engines, search strings such as the following one are usually built "house AND home AND NOT (mountain OR country))", where the elements "house", "home", "mountain", and "country" implicitly mean that the search results must include or not include those words. The meaning of the 'XYZ' character strings might be very widh, such as for example "Pythagoras was Greek", and in this case the resulting action would evaluate whether the sought entities contain any reference to that circumstance (Pythagoras being Greek). An additional way to use variables in an implicit form would be, for example, using fragments such as the following one "'House' In Title", where the fragment would be true when the word "House" is contained in the title of a document. Besides all the previous examples, there might also exist other ways to build calculation expressions.

In order to facilitate the exposition, in this document the Boolean operators that will be used are the following ones: "AND", "OR", "NOT", "and", "or", "not"; that is to say, the operators will be used in upper case or lower case, depending on the circumstance, in order to avoid confusion with the other characters that exist in the context in which the operators are being used.

In order to finish this introduction to calculation expressions, Exhibit 2 shows an expression that contains only arithmetic operators and variables, Exhibit 3 shows an expression that contains only logical operators and variables, Exhibit 4 shows an expression that contains operators and variables of both logical and arithmetic types, and Exhibit 5 shows an expression that utilizes comparative fragments.

$$"(A+B)*C+3*A"  \quad \text{Exhibit 2}$$

where "A","B" y "C" are variables that can take numeric values $$"(U \text{ or } V) \text{ and } Z \text{ or } U \text{ and } V" \quad \text{Exhibit 3}$$

where "U", "V" y "Z" are variables that can take logical values, and where 'or', and 'and' are logical operators.

$$"(A>B) \text{ and } (3 *A<Z) \text{ or } U" \quad \text{Exhibit 4}$$

where "A", "B" and "C" are variables that take numeric values, "U" takes logical values and "and" and "or" are logical operators.

$$"(Topic='Essay' \text{ or } (U \text{ and not } V) \text{ or } (A>B)" \quad \text{Exhibit 5}$$

where "Topic" is a textual variable, "Essay" is a value, and the other data have been previously defined.

Creating calculation expressions is usually very difficult for the person that is not an expert in informatics or mathematics. It can also be very complicated for the expert, especially when the expression has several embedding levels. For example, Exhibit 6 shows a complex calculation expression. It can be seen that it is very difficult to identify the fragments on which the different parenthesis are applied.

$$(((A+C/(D+B))*(F+(E*(A+(B+C)/F))))+(G/(H*(H+I))))*A \quad \text{Exhibit 6}$$

In order to better illustrate this difficulty, the same expression has been replicated in Exhibit 7, but an error has been intentionally introduced in it, by removing a parenthesis. When the formula in Exhibit 7 is examined, without comparing to the formula in Exhibit 6, it is very difficult to find this error, even for persons who are accustomed to work with this type of expressions.

$$(((A+C/(D+B))*(F+(E*A+(B+C)/F))))+(G/(H*(H+I))))*A \quad \text{Exhibit 7}$$

Nowadays, there exist several ways to facilitate the creation of calculation expressions for spreadsheet applications and for environments to manage databases.

For example, in Microsoft Excel, the program evaluates the expressions that contain parenthesis and shows a color coding that facilitates the identification of the different start and end parenthesis that are associated with each other. However, even with this tool, creating expressions that have a certain length is very difficult. Additionally, even if the expression that has been created is correct, it is difficult to evaluate whether it has the meaning that was intended.

Also in Microsoft Excel, there exists a tool that shows the results that are obtained when the formula is calculated step by step. The disadvantage of this tool is that at each step there is some information related to the previous steps that have already been calculated that is not shown.

In the case of calculation expressions that are used to build search strings, there exist several ways in order to simplify the creation of expressions. For example, Microsoft Access contains a tool that is intended for creating expressions, and which is schematically shown in Exhibit 8, The expression that corresponds to the data of the table that is shown in Exhibit 8, when that tool is used, is shown in Exhibit 9.

Exhibit 8

| | Field: | | |
|---|---|---|---|
| | Field1 | Field2 | Field3 |
| Table: | | | |
| Criteria: | LIKE 'H' AND LIKE 'R' | 'P' | |
| or: | | 'Q' | 'R' |

"(Field1 LIKE 'H' AND Field1 LIKE 'R') AND
(Field2='P') OR (Field2='Q') AND
(Field3='R')"  Exhibit 9

This is a useful tool, and it can be used to generate any type of logical expression that depends on the conditions that exist in the different cells. The tool is based on a result of boolean algebra that states that any logical expression can be expressed as a combination of sums of products [Garcia, A., Golderos, A., López-Barrio, C., Muñoz, E., Nombela, J. R., Padilla, I. (1989): "Electronic Circuits: Digital II", Madrid: ETST Ingenieros de Telecomunicación]. The problem with this tool is that there exist many expressions that cannot be easily expressed as sum of products, because they require some skills in managing boolean algebra. For example, a query as the one shown in Exhibit 10 requires a transformation that is not obvious for many people.

(Field1='A' o Field2='B') and (Field1='C' o Field2='D')　　　　　　　Exhibit 10

Another way to simplify query construction, and one which is used especially in Internet search engines, is based on using simple interfaces that are easier to use. The disadvantage with this approaches is that they only allow to create searches that have low level of sophistication. An example of this is, for example, the search interface in Google.

In conclusion, it is necessary to develop new proposals that will allow to easily build sophisticated calculation expressions. This would allow that all the power of applications would be well exploited, and it would allow to easily access the large amount of information that nowadays exists. Despite the fact that calculation expressions are being used since long time ago—in informatics, in general, they have been used since the appearance of the first computer programs—this need has not been satisfactorily covered until now.

EXPLANATION OF THE INVENTION

The present invention facilitates managing sophisticated calculation expressions. In order to do that, the invention is based on managing calculation expressions by managing certain graphical expressions that represent trees. As will be explained in other sections of this document, this approach can be used to build different embodiments that provide different advantages. For example, in the preferred embodiment, said graphical structures are controlled by a computer system that allows to edit data and which gathers, disaggregates and manipulates the data that have been entered at each moment.

For example, the calculation expression that is shown in Exhibit 11 can be represented as the graphical structures that are shown in FIGS. 1, 2 and 3.

A/((B+C)*(D+E))　　　　　　　Exhibit 11

There are different types of graphical structures that allow to graphically represent a tree. The three types of graphical structures that have been used in FIGS. 1, 2 and 3 are the tower structure, the vertical structure and the escalator structure, respectively. It must be borne in mind that these and other representations that can be shown in this document are concrete examples that are used to describe the invention, and it must be understood that these examples are not intended to limit the scope of the invention. The invention might comprise one or several of these types of graphical representations, or it might comprise other different type of arboreal graphical representation. In the section "Exposition of other embodiments", other types of arboreal graphical representations are described.

The expression in Exhibit 11 is sufficiently clear so that it is not necessary to use any aid tool, but it will help to explain the invention.

FIG. 1 shows an arboreal structure, called tower structure, which has been developed for the expression that appears in Exhibit 11. The essence of the tower structure is that the different nodes of the tree are organized in vertical fashion. The Microsoft Treeview control, which is used in the operating system Microsoft Windows, is an example of a tower structure.

FIG. 2 shows the vertical structure of the expression that is shown in Exhibit 11. The vertical structure is the classical structure that is used in mathematical analysis on trees and graphs.

FIG. 3 shows the escalator structure that corresponds to the calculation expression that is shown in Exhibit 11. The escalator structure is characterized because it distributes the nodes in different levels of a multiline figure, and the level of each node depends on the embedding level that the node has. In this example, a top level 3001 has been added to show the full expression, and it has been separated with a thick line 3002, so that the position of the elements that are located in different levels can be easily compared with the position that they occupy in the complete expression. In order to do that, both positions can be visually compared.

An advantage of the escalator structure when compared to the tower structure and to the vertical structure is that, in the former, the horizontality of each level is maintained. That is to say, for each level, the elements, operators and functions that appear are aligned with the elements of the other levels, so that by inspecting the structure in an horizontal direction it is possible to cover all the expression, by changing the level at each point.

In order to better explain the nature of the invention, it is useful to make some remarks about calculation expressions, and define some concepts. Primarily, calculation expressions contain explicit and implicit parenthesis. Explicit parenthesis are those delimiting characters that can be physically seen. For example, in Exhibit 12, they would be the start parenthesis that is located between 'A' and 'B', and the end parenthesis that is located after 'B'. The implicit parenthesis are those ones that are related to the order in which the different operators and functions are applied in the expression. This order is defined by the priority of some operators over other operators and by the position that the different elements occupy in the expression. For example, in Exhibit 13, the first operation that is performed is 'C*D', and because of that it can be assumed that both elements are surrounded by implicit parenthesis.

A*(B+C)　　　　　　　Exhibit 12

'A+B+C*D' is equivalent to 'A+B+(C*D)'　　　　　　　Exhibit 13

In an expression that is well built, for each start parenthesis there is an end parenthesis. In order to facilitate the exposition, in this document each pair of parenthesis which are related in that way will be called ASSOCIATED PARENTHESIS. Also in this document, a TERM is the fragment of the expression that is located between two associated parenthesis, i.e. between a start parenthesis and its corresponding end parenthesis. Also in this document, if the parenthesis that surround the term are explicit parenthesis, the term will be called EXPLICIT TERM, and if they are implicit parenthesis, the term will be called IMPLICIT TERM. In this document, an isolated term is not interpreted as an implicit term; this is so despite the fact that if the element were located between parenthesis, the value of the expression would not change.

It is easy to see that a calculation expression that is well built can be conceptualized as a tree, as was mentioned before. This is due to the fact that in a calculation expression that is well built, the terms satisfy the following condition: "if two terms share any fragment of the logical expression, one of the terms is completely included in the other one". This way, if a term A is included in a term B, and there is no other term between them, the term B is the parent of the term A. The result is that either each term has only one parent term or it does not have any one. The terms that have the same parent are sister terms. Because of that, the terms can be organized in the form of a tree.

A tree is made up of nodes. Depending on how the expression is created, in each node there is a term or an element. A term might be of different types, such as for example:
1. a term that contains other explicit terms
2. a term that does not contain other explicit terms
3. a term that might be an implicit term
4. an element
5. other type of term, In order to better describe the invention, two simple trees are shown in exhibits 13b and 13c that represent the expression that was analyzed in Exhibit 1b. The nodes of the tree will be shown as consecutive lines, where indentation will indicate parent-child relationship, as is customary in trees. The figures in the left column are used to refer to each node.

It can be seen in Exhibit 13b that the nodes of the tree are either items (such as node 1, "X>3" or intermediate subexpressions, such as node 2, "or (Y=0) and ((A or B) and (C and not D))" (the meaning of "subexpressions" has been defined at the beginning of this patent application).

There are two types of intermediate subexpressions in the tree:
node 5, "A or B", is a regular intermediate subexpression.
node 8, "and (C and not D)", is an introduced intermediate subexpression.

Also, nodes that represent introduced intermediate subexpressions could be conceptualized as regular intermediate subexpressions to which an operator has been added. That is node 9 could be interpreted as been "(C and not D)", and the operator could be added afterwards. Therefore, the key point in order to describe the tree decomposition that is described in this patent application is that at least one of the nodes is an intermediate subexpression, and the subexpression can be understood as either encompassing the introducing operator or not.

Exhibit 13b

| No. | Node |
|---|---|
| 0 | (X > 3) or (Y = 0) and ((A or B) and (C and not D) )Node |
| 1 | X > 3 |
| 2 | or (Y = 0) and ((A or B) and (C and not D) ) |
| 3 | (Y = 0) |
| 4 | and (A or B) and (C and not D) ) |
| 5 | A or B |
| 6 | A |
| 7 | or B |
| 8 | and (C and not D) |
| 9 | C |
| 10 | and not D |

Exhibit 13c shows a tree for the same expression that is shown in Exhibit 13b. In this case, node 2 is shown collapsed. It can be seen in this Exhibit that the essence of the invention is that at least one of the nodes is an intermediate subexpression.

Exhibit 13c

| No. | Node |
|---|---|
| 0 | (X > 3) or (Y = 0) and ((A or B) and (C and not D) ) |
| 1 | X > 3 |
| 2 | or (Y = 0) and ((A or B) and (C and not D) ) |

Exhibit 13d shows the nature of the invention in more details. In this case, the Exhibit shows a tree decomposition of the same expression that was shown in the two previous Exhibits, but in this case the approach described in U.S. Pat. No. 5,471,613 is utilized. It can be seen that the main difference between the current patent application and U.S. Pat. No. 5,471,613 is that the current patent application shows intermediate subexpressions in the tree, which greatly facilitates comprehending the structure of tree and of the expression.

Exhibit 13d

| No. | Node |
|---|---|
| 0 | (X > 3) or (Y = 0) and ((A or B) and (C and not D) ) |
| 1 | or |
| 2 | X > 3 |
| 3 | and |
| 4 | Y = 0 |
| 5 | and |
| 6 | or |
| 7 | A |
| 8 | B |
| 9 | and not |
| 10 | C |
| 11 | D |

A convenient way to summarize the previous exposition is the following. The tree allows to see at least one fragment of the expression in at least two different nodes, one of the nodes being the parent of the other one. For example, as can be seen in Exhibit 13b, the fragment "A or B" is shown in nodes 0, 2, 4 and 5. In this case, node 0 is the parent of node 2; node 2 is the parent of node 4, and node 4 is the parent of node 5.

This feature is a crucial part of the invention, because it allows the user to navigate into the expression, allowing him/her to better understand its structure.

This feature is not included in U.S. Pat. No. 5,471,613, and it is not included either in U,S. Pat. No. 6,263,328.

U.S. Pat. No. 6,263,328 discloses an invention to facilitate creating database queries. However, in this invention, there are no intermediate subexpressions. An even though the invention contains a type of representation that might resemble an intermediate subexpression, it does not have any feature to allow the user to access to any part of the expression in two different nodes of the tree. As has been explained, this access is a key part of the current invention.

In order to continue showing the advantages of the invention, the next lines describe and show several arboreal structures for different calculation expressions that have more complexity than the previous ones.

For example, let us assume that there exists a book database, so that the books have the attributes and values that are shown in Exhibit 14. Let us also assume that the values "Accounting", "Finance", "Entrepreneurship", "Human Resources", "Strategy", and "Marketing" are subcategories of "Business".

Exhibit 14

| ATTRIBUTE | VALUES |
|---|---|
| Style | Essay, Novel, Short Story, Poetry |
| Orientation | History, Biography, Self help, Technical, Divulgation |
| Topic | Business, Accounting, Finance, Entrepreneurship, Human Resources, Strategy, Marketing, Science, Engineering, Tourism, Religion |

-continued

| ATTRIBUTE | VALUES |
|---|---|
| Language | Spanish, English, French, Russian |
| Year | 1900-2004 |

Let us assume in this case that a person wants to perform a query for which the logic condition is the one that is shown in Exhibit 15.

Style=Essay AND ((Orientation=History AND NOT
Year<1990) OR (Orientation=Biography AND
NOT Year <1995)) AND (Topic=Business AND
NOT (Topic=Accounting OR Topic=Finance)
AND ((Language=English OR
(Language=French AND Year>2000) OR
(Language=Russian AND Year>2002))    Exhibit 15

The tower structure of this expression might be the one shown in FIG. 4. FIGS. 5, 6 and 7 show the case of a particular embodiment in which an optional feature has been added for allowing to open and close the nodes of the tree. It can be seen that a node that has children is equivalent to the compounding of its child nodes by using the logical operators that might be assigned to each child. For example, the node 4001 "Language=Russian AND Year>2002" can be obtained by compounding the node 4002 "Language=Russian" with the node 4003 "Year>2002", by using the operator 4004 "AND". The same process can be applied to all the nodes of the arboreal graphical structures, by modifying the type of the operator and the layout of the nodes.

In other example that describes the invention, FIG. 8 shows the tower structure for the arithmetic expression of Exhibit 6, which is quite complex. FIG. 9 shows the vertical structure of the expression of FIG. 8. FIG. 10 shows the same vertical structure of FIG. 9, but in this one a node has been closed. FIG. 11 shows the escalator structure of the expression of FIG. 8.

FIG. 11 shows an additional feature of escalator structures. As can be seen in the Figure, in this example the elements that are sisters on the left to a term (such as for example the element "A" 1101) are located at a level that is previous to the level of the term to which they are sisters, and the terms that are sisters on the right (for example, the element "F" 1102) are located at the same level as the term. This is a particular decision that corresponds to the particular embodiment to which the example corresponds, because this level assignment might be different in other embodiments.

Depending on the particular embodiment in which the invention is implemented, and depending on the functionality that is added, the invention can be used for a multiplicity of purposes. For example, it can be used for comprehending expressions that have already been built and/or for building new expressions.

In order to comprehend expressions that have already been created, the expression would be entered into the invention and its structure would be inspected. This approach can also be used for expressions that have been created incorrectly. In these cases, the invention could be embodied in such as way that one or more parenthesis could be ignored, so that a tree would be created that would fit the calculation expression.

FIG. 12 shows an example of the process that could be followed in order to built expressions. In order to explain this process, a process call SISTERING will be defined. SISTERING is a process by which one or more cells end up being related, so that when certain operators are applied to them, they become child cells to a parent cell. Sistering might produce a new parent cell. In other cases, cells might be sistered to a preexisting cell that already had a parent cell. It is also possible to choose two cells and decide that one of them will become the parent cell to the other one. How all this is done depends on the particular embodiment. FIG. 12 has been built as schematically as possible in order to facilitate the exposition. It must be understood that a real embodiment of the invention would comprise means, controls and other mechanisms that would allow to perform the actions that are mentioned in the Figure. Furthermore, the utilization of the invention does not need to follow exactly the actions that were described, nor the same number of actions; the actions that are shown are intended only for describing the optional features of the invention.

In this example, the process starts with a blank background in which the structure will be created. In a possible utilization of a possible embodiment of the invention, it would be possible to execute for example the following actions:

1. Action 1. The user creates a first cell, in which it is possible to enter operators and variables.
2. Action 2. The user creates a second cell and enters two variables into it: 'D' y 'E'.
3. Action 3. The user adds an operator '+' to one of the cells.
4. Action 4. The user sisters the two existing cells, and in this example the system as a result creates a cell that acts as parent of both of them, and which contains the result of applying the existing operator to both existing variables. In this particular example, the system has also performed the following action: it has added an indicator that shows that the parent cell is open, it has indented the cells that have been sistered, with the purpose to show that they are sister cells to the parent cell, and it has underlined the content of the parent cell to indicate that it is a secondary cell.
5. Action 5. The user creates two more cells, and a new operator.
6. Action 6. The user sisters the cells that contain the variables B and C. From this point onwards, it would be possible to add new variables and operators that would yield the full structure of the expression that is shown in Exhibit 11.

It would be possible to follow a similar process with the other types of arboreal graphical representations, which process should be adapted to the particular characteristics of each type of representation.

FIGS. 13 and 14 describe an optional feature that shows how the invention facilitates the creation of complex queries for databases, Internet or other environment. The first step for the user might be creating a set of conditions, such as the ones that are shown in FIG. 13. Once the user has created all the conditions that are relevant for him or for her, he or she can start to aggregate them to build more complex terms, as shown in FIG. 14, where cells 1401 and 1402 have been sistered and a parent cell 1403 has been created.

Advantages of the Invention

The invention provides two important advantages, as has been shown in the Figures and in the previous explanations:
1. It facilitates to better evaluate the meaning of a given calculation expression. That is to say, if the user builds an expression that is formally correct, he/she can evaluate whether the expression means exactly what he/she expected. This advantage is important, especially when a user is revising an expression that was created long time before or when a person is inspecting an expression that has been created by a different user.
2. It facilitates the creation of calculation expression in a much solid way than with the techniques that currently exist.

The inventive character of the invention is emphasized by the fact that calculation expressions have been used since long time ago and, as far as has been known, during these years no proposal similar to this one has been produced. For example, in the U.S. Pat. No. 5,471,613, "Tree structure representation of an SQL clause", a tree based approach is used to solve the problem of data base querying. However, that approach is different from the approach undertaken in the present patent application, and the approach is very difficult to utilize.

DESCRIPTION OF THE DRAWINGS

FIG. 5 shows a tower structure for a complex logical expression, in which the root node has been collapsed.
FIG. 6 shows a tower structure for a complex logical expression in which several nodes are closed.
FIG. 7 shows a tower structure for a complex logical expression in which several nodes are closed.
FIG. 12 shows a process that might be followed in order to create a tower structure.
FIG. 25 shows a possible way to emphasize nodes and terms in an escalator structure for a complex calculation expression.
FIG. 26 shows a possible way to emphasize nodes and terms in an escalator structure for a complex calculation expression.
FIG. 27 shows a possible way to emphasize nodes and terms in an escalator structure for a complex calculation expression.
FIG. 44 shows a relief structure
FIG. 45 shows a relief structure
FIG. 46 shows an escalator structure in which the parenthesis have been removed.

EXPOSITION OF AN EMBODIMENT OF THE INVENTION

Exposition Of The Preferred Embodiment
Several Additional Features

An optional feature that has already been mentioned is the utilization, for the different arboreal structures, of the typical functions for expanding and collapsing nodes. This optional feature was described earlier in order to better explain the advantages of the invention. Collapsing nodes is very useful in order to focus the attention to different levels within the tree. Optionally it is also possible to add graphical means that indicate whether a node is expanded or collapsed.

Figure 1:
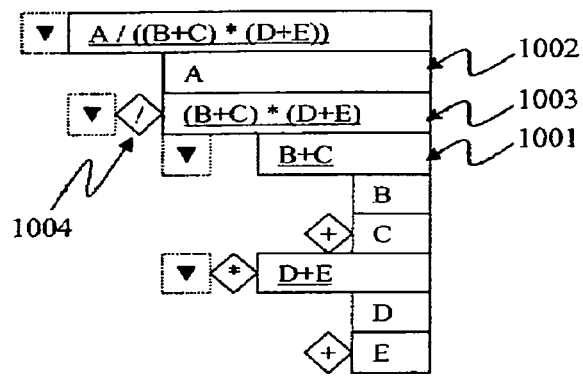
FIG. 1 shows a tower structure for a simple expression
Figure 2:
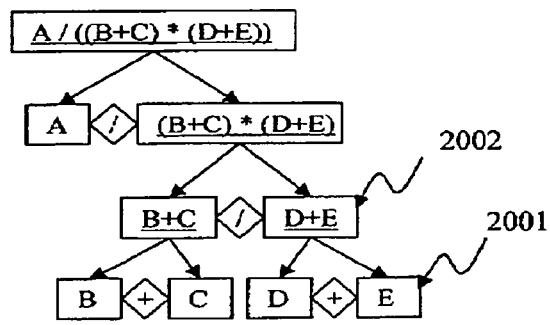
FIG. 2 shows a vertical structure for a simple expression.
Figure 3:
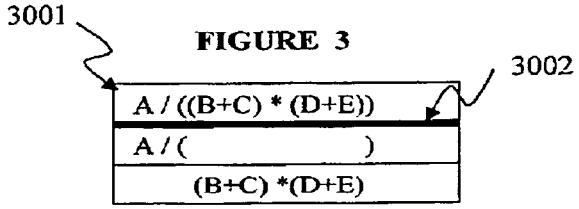
FIG. 3 shows an escalator structure for a simple expression.
Figure 4:
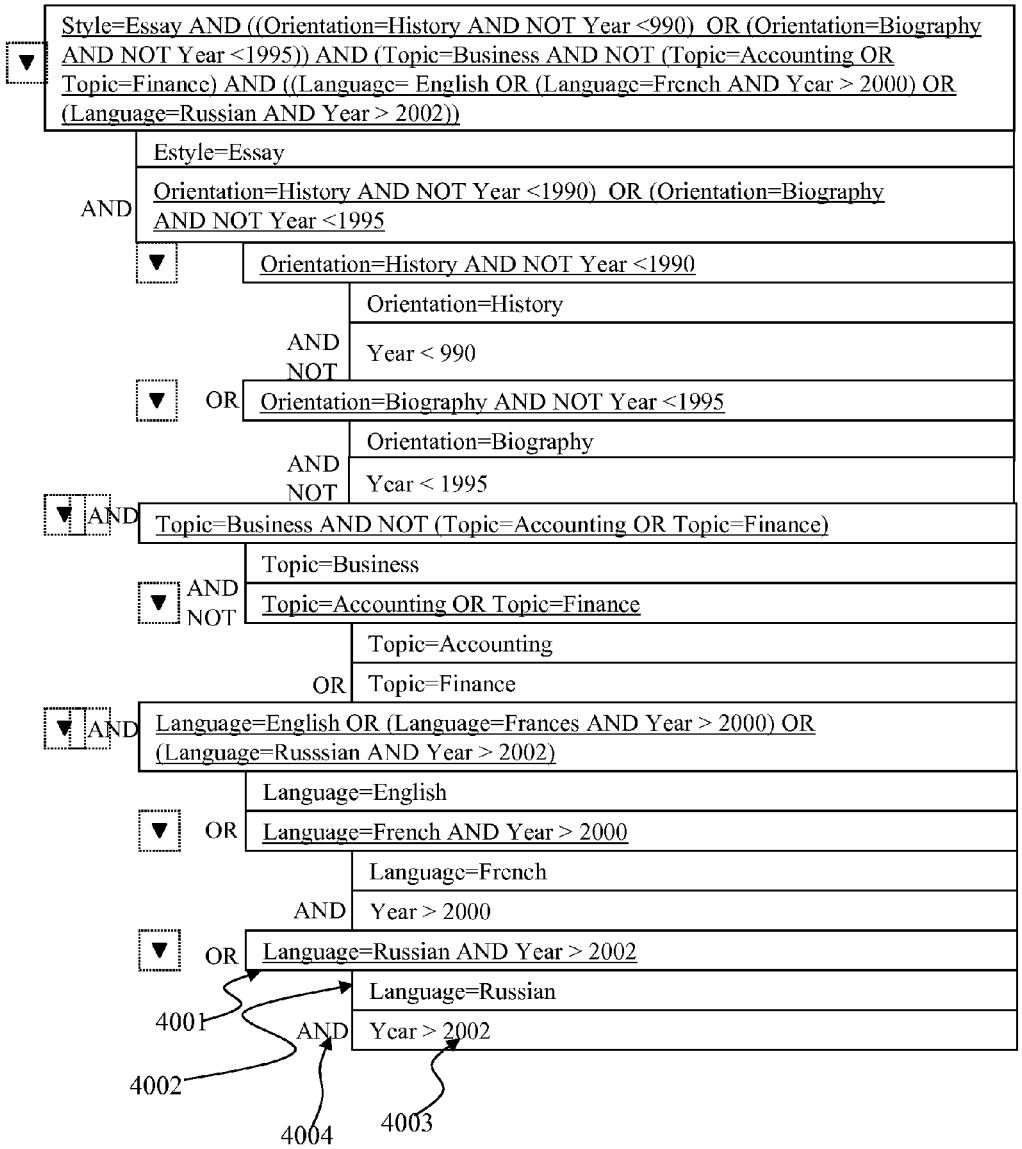
FIG. 4 shows a tower structure for a complex logical expression.
Figure 8:
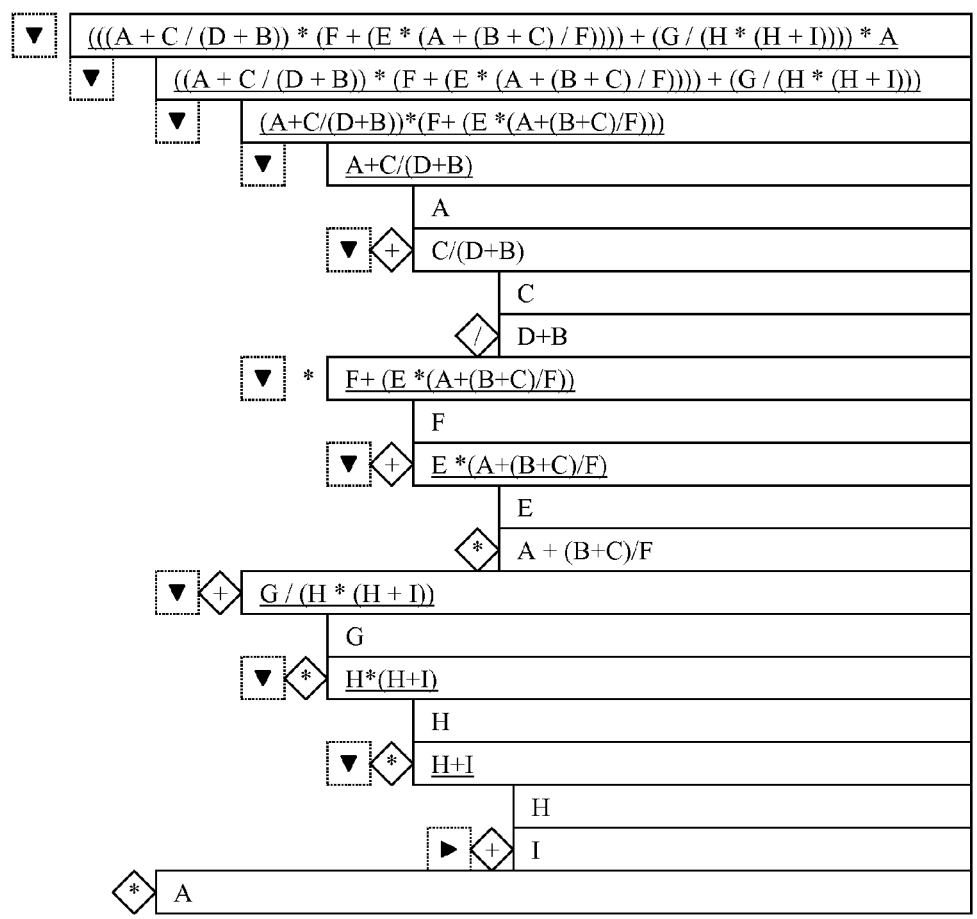
FIG. 8 shows a tower structure for a complex numeric expression.
Figure 9:
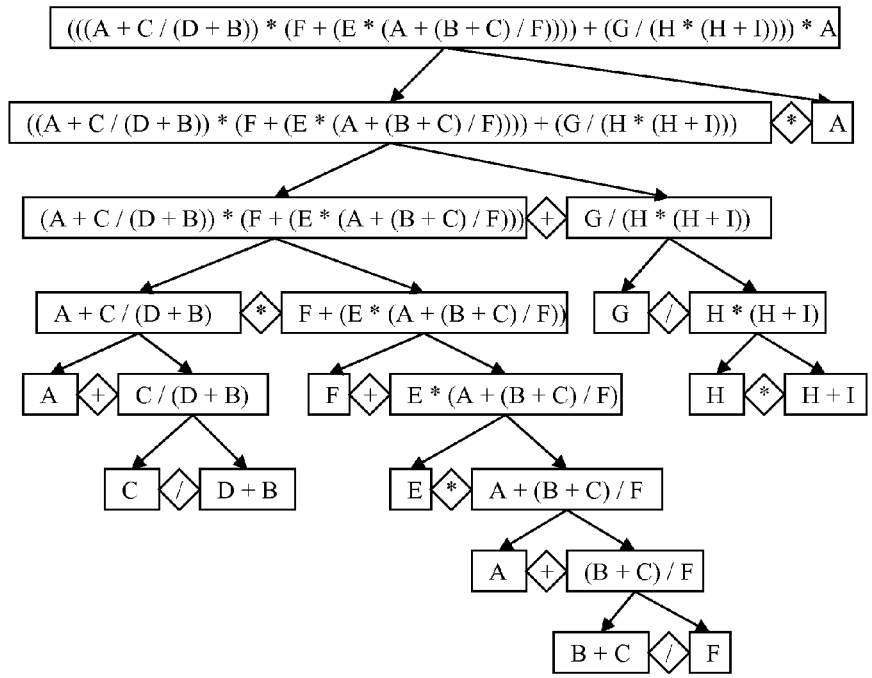
FIG. 9 shows a vertical structure for a complex numeric expression.
Figure 10:
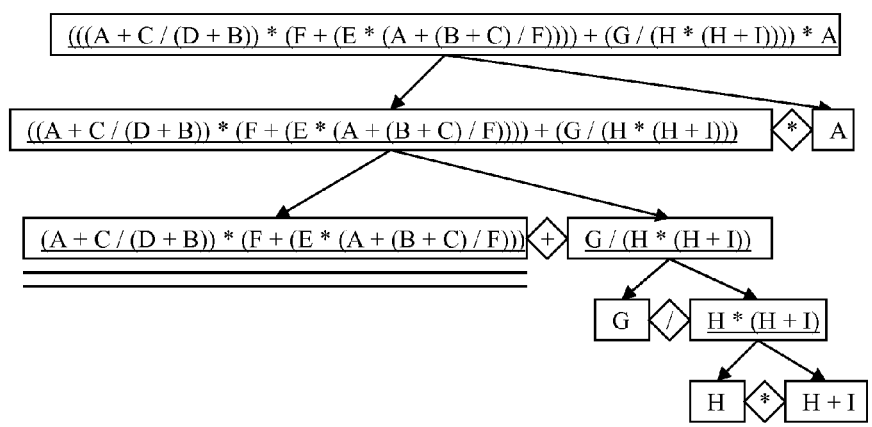
FIG. 10 shows a vertical structure for a complex numeric expression in which there is a closed node.
Figure 15:
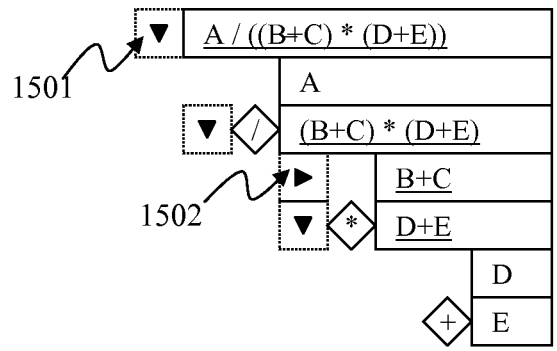
FIG. 15 shows a tower structure in which a node is closed.

FIG. 15 shows the tower structure of FIG. 1 in which a node has been collapsed. It can be seen that, as is customary in graphical interfaces, in this particular embodiment there exist graphical indicators that indicate whether a node is expanded or collapsed. In this particular case, the indicator 1501 indicates that a node is expanded and the indicator 1502 indicates that a node is collapsed. In all cases, the utilization of indicators and the type of those that is used is considered an optional question, which is within the prior art.

Figure 16:
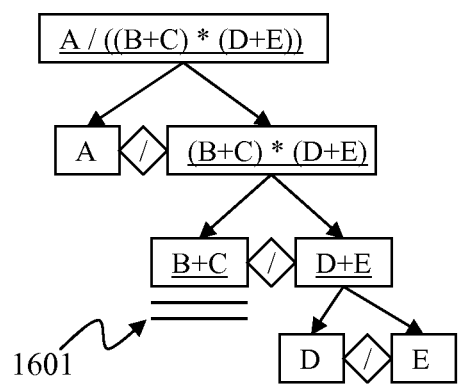
FIG. 16 shows a vertical structure in which a node is closed.

FIG. 16 shows the vertical structure in which one of the nodes has been collapsed. In this particular example, an indicator 1601 has been added to show that a node is collapsed; the indicator that has been used in this particular example are two horizontal lines that are located below the cell that is collapsed.

Figure 17:
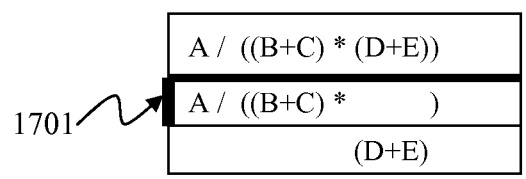
FIG. 17 shows a escalator structure in which a node is closed.
Figure 18:
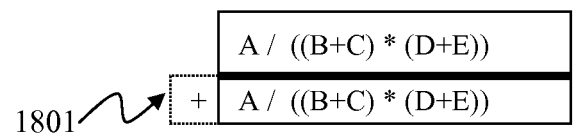
FIG. 18 shows an escalator structure in which a full level is closed.

In the escalator structure, expanding and collapsing nodes is done in a different way than in the other types of structures. FIG. 17 shows an escalator structure where one of the inferior nodes has been collapsed. FIG. 18 shows the same structure, in which all the nodes in the last level have been collapsed, which produces as a result that the level is completely collapsed. In these two particular examples, different indicators have been used to show that a node is collapsed or that a whole level is collapsed. For the case in which a single node has been collapsed, a thick vertical line 1701 has been added at the left of one of the cells. For the case in which the whole level has been collapsed, a sign "+" 1801 has been added at the left of the cell that is on top of the cell that has been collapsed.

The invention can comprise mechanisms in order to emphasize certain terms. FIGS. 19, 20, 21, 22, 23 and 24 show several examples of the utilization of those mechanisms for arboreal structures that represent the expression shown in Exhibit 11. It must be understood that these examples are only intended to illustrate the exposition, and that other types of means might have been used to emphasize those terms.

Figure 19:
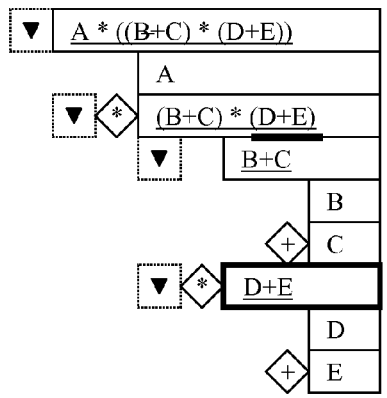
FIG. 19 shows a possible way to emphasize nodes and terms in a tower structure.
Figure 20:
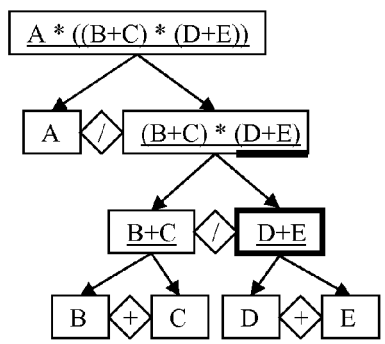
FIG. 20 shows a possible way to emphasize nodes and terms in a vertical structure.
Figure 21:
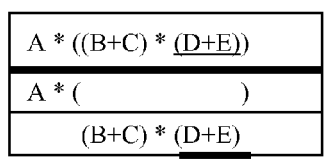
FIG. 21 shows a possible way to emphasize nodes and terms in an escalator structure.

FIG. 19 shows an example of how a term can be emphasized. The term is a node of the tree and it is also shown within another node. FIG. 20 shows the same expression in the form of vertical structure, and in this one the same term has been emphasized as in FIG. 19. FIG. 21 shows a possible way to emphasize the same term as in FIGS. 19 and 20, in which the same term has been emphasized.

Figure 22:
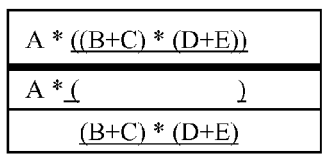
FIG. 22 shows a possible way to emphasize nodes and terms in an escalator structure.
Figure 23:
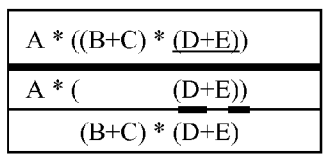
FIG. 23 shows a possible way to emphasize nodes and terms in an escalator structure.
Figure 24:
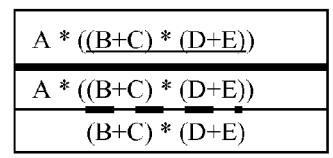
FIG. 24 shows a possible way to emphasize nodes and terms in an escalator structure.

The escalator structure allows several additional ways to emphasize terms or nodes, as shown in FIGS. 22, 23, and 24. FIG. 22 shows how to apply a particular type of emphasis to the expression in different levels. FIG. 23 uses a technique that is characterized by replicating a term in a cell that does not corresponds to the level of the node and, also, this replicated term has been emphasized in order to make it more salient. In the Figure, the replicated fragment has been marked with thick discontinuous line, but in the preferred embodiment a particular font color would be used. FIG. 24 shows the same technique as in FIG. 23, but applied over the two lower nodes.

FIGS. 25, 26 and 27 show additional examples of the escalator structure for a complex expression in which the previous techniques for emphasizing nodes have been used.

The graphical trees created by the current invention are characterized by the following:

One or more of their nodes contains an intermediate subexpression. (It could also be said that "one or more of their nodes 'is' or 'shows' an intermediate subexpression") For example, in FIG. 1 node 1001 is an intermediate subexpression. In fact, it is not an item, because it is composed by two items (B and C) and an operator +. Node 1002 is an item.

One or more of the nodes contains an introduced intermediate subexpression. Node 1003 is an introduced intermediate subexpression, because it contains the operator 1004. As mentioned before, some times an introduced subexpression might have two operators, such as "AND NOT", in logical expressions.

One more of the nodes contains an regular intermediate subexpression. Node 1001 is a regular subexpression.

Figure 11:
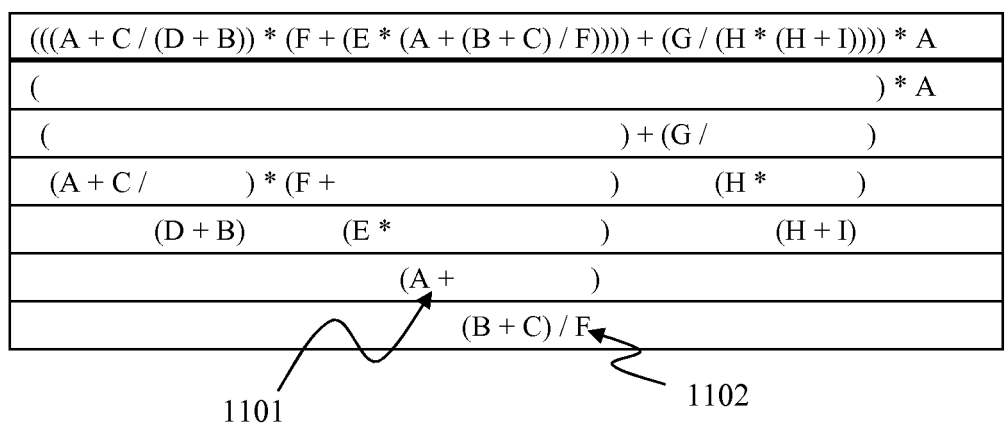
FIG. 11 shows an escalator structure for a complex numeric expression
Figures 13, 14:
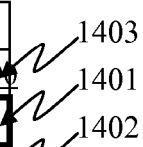
FIG. 13 shows a manner in which it is possible to start the construction of a logical expression that might be used to build a search query.
FIG. 14 shows a manner in which it is possible to continue the construction of a logical expression that might be used to build a search query.

The escalator structure also shares these characteristics. For example, FIG. 11 shows that a given subexpression can be readily seen by navigating down the structure and up again. For example, the subexpression "A+(B+D)/F" can be observed by starting in element 1101, moving down one level, and continuing at that level to reach element F, where we can move up again to the starting level.

This can be more easily seen by using different features of the invention, such as emphasizing. FIGS. 25, 26 and 27 illustrate how this function allows to more easily see the different subexpressions. Collapsing/expanding nodes in the escalator structure also serve the same purpose, as shown in FIG. 17 and FIG. 18.

Figure 28:
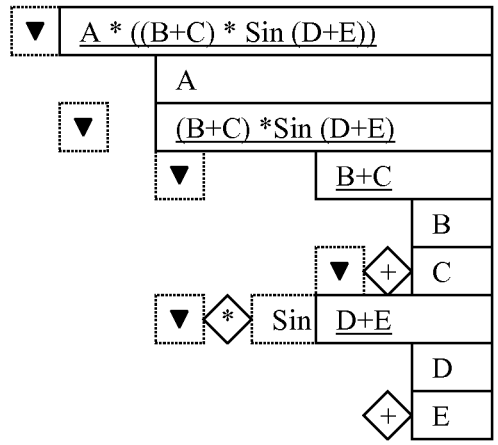
FIG. 28 shows a tower structure in which a one-variable function is being used.
Figure 29:
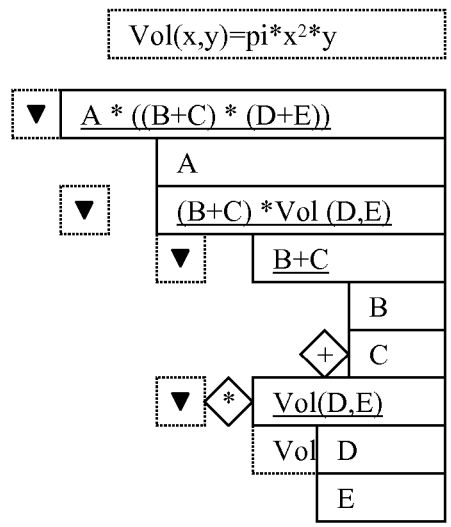
FIG. 29 shows a tower structure in which a two-variable function is being used.
Figure 30:
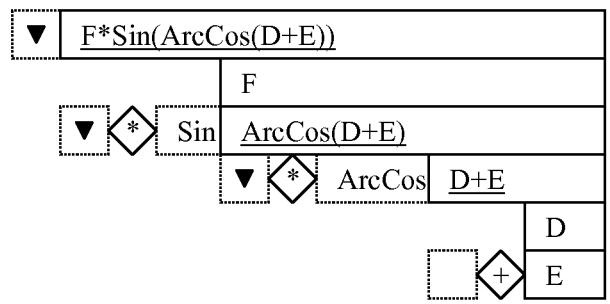
FIG. 30 shows a tower structure in which a function is being used over another function.

The invention also allows to use functions, in addition to operators. FIG. 28 shows the utilization of the function "Sin". FIG. 29 shows one of the ways in which a two variable function can be used. FIG. 30 shows the form in which the function ("Arc Cos") can be used in a case in which the parent node has a single child node, and it also shows how to embed a function within another function (in this case "Sin" and "Arc Cos")

Another optional feature is PEER GROUPING, whose goal is to facilitate the utilization of the invention to those user who are less experienced in the utilization of calculation expressions. This feature is based on requiring that all nodes that are sisters be joined by the same type of operator or by operators that have the same priority. That is to say, it would prohibit the creation of expressions such as A*B+C+D, because the variables 'A', 'B', 'C' y 'D' are sisters, and the operators '*' y '+' do not have the same priority. This same expression can be modified in order to look as (A*B)+C+D. Imposing this obligation would allow for those users who are less experienced not to make mistakes when evaluating the priority of operators, because otherwise they might erroneously consider that the expression A*B+C+D has the same meaning as A*(B+C+D).

Figure 31:
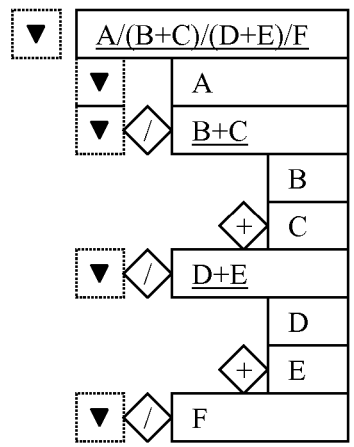
FIG. 31 shows a structure in which several sister nodes are joined by operators that do not satisfy the associative property.
Figure 32:
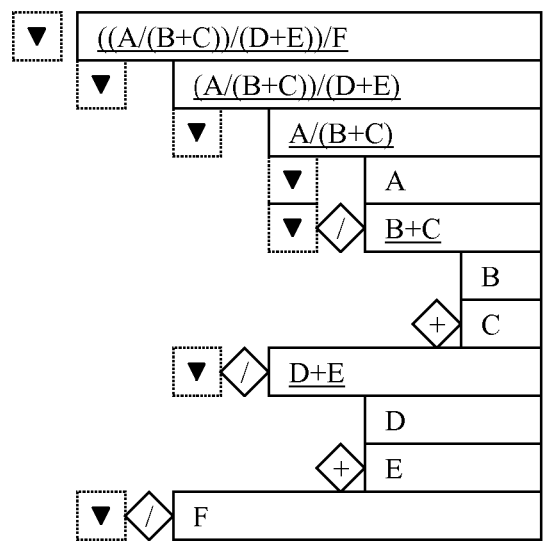
FIG. 32 shows a possible way to avoid a situation in which several sister nodes are joined by operators that do not satisfy the associative property.

Another optional feature, similar to the previous one, is SEQUENCIATION OF NON ASSOCIATIVE OPERATORS, which also has the objective to facilitate the utilization of the invention to those user who are less experienced. This feature is related to the computation of expressions in which there are operators of the same of different type, which might have the same level of priority, but which do not follow the associative property. An example is the expression A/B/C/D, which is shown in FIG. 31. This expression is formally identical to (((A/B)/C)/D), but a person who is not very experienced might wrongly think that it is equivalent to (A/(B/(C/D))). In order to prevent this type of mistakes, the sequenciation of non associative operators is characterized by requiring the user to clearly mark the parenthesis in this type of expressions, as shown in FIG. 32.

An alternative way to prevent the previous errors without applying any type of obligation or restriction is warning the user when there exist expressions that contain characteristics like the ones that were just mentioned, so that he/she be alert to the possible error.

Besides the optional features that were previously explained, the invention can also comprise additional optional function.

Figure 33:
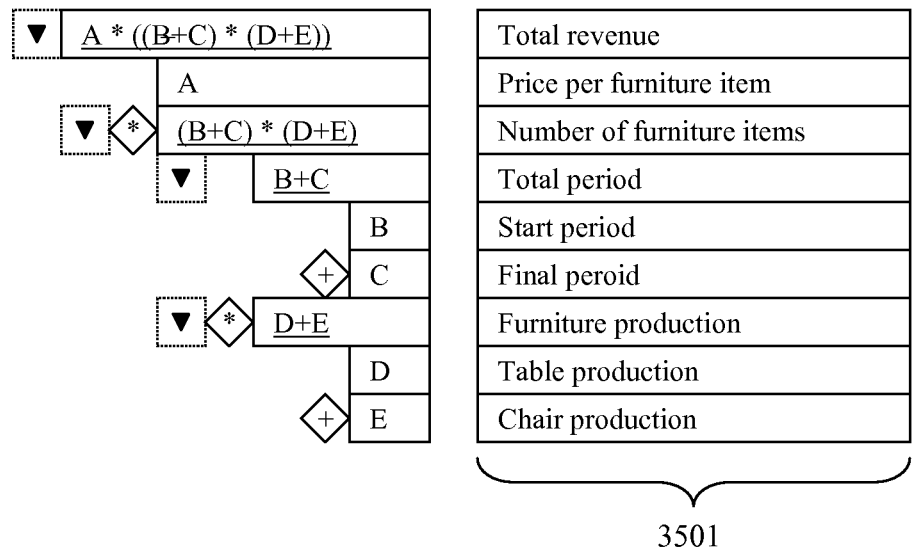
FIG. 33 shows a structure that shows the functionality called 'explicative text'.

One of these optional functions is EXPLICATIVE TEXT. This functionality helps the user in interpreting the content of each cell, and it can be performed by adding verbal expression to each cell, where that verbal expression can be related to the calculation expression. This functionality can be embodied in different ways. FIG. 33 shows a way in which it can be implemented. As can be seen, the cells 3301 contain verbal descriptions of the content of the cells on the left. This functionality can be applied to all types of calculation expressions, independently on whether they are numeric, logical or of other type.

Figure 34:
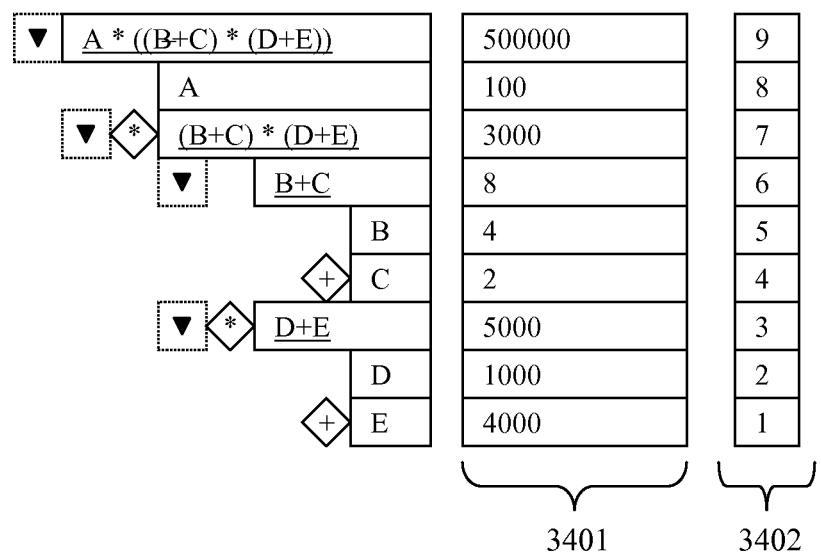
FIG. 34 shows a structure that shows the functionality called 'partial results' and the functionality called 'incremental computation'.

Another optional functionality is PARTIAL RESULTS, which is shown in FIG. 34. In the Figure, this functionality uses a number of spots 3401 which would show the result obtained after evaluating the calculation expression for each node. In case the expression was a function, as happens in FIG. 34 the value that can be shown in that spot is the value of the function at this point in the calculation process. In case the expression was being used for creating a query, for example in a database or in a different environment, the values that would be shown in the cells might be the number of records or entities that satisfy the criterion of each one of the nodes. For calculation expressions which are logical expressions, the values that would be shown might be the logical value of the expression at different points in the calculation process for a record or entity in particular.

Another optional functionality that can be added is the function of INCREMENTAL COMPUTATION, which is based on a dynamic demonstration of how the expression is evaluated. That is, the different nodes of the tree might be consecutively emphasized as they are evaluated, and the user might inspect the evolution of the value of the expression. Normally, there exist different possible orders for performing the evaluation. In general, the evaluation always starts by the levels that are more deeply embedded and progresses towards the levels that are less embedded. In FIG. 34, the spot 3402 shows a possible order, which evolves from the lower nodes to the upper ones, but other orders might also be possible.

Before moving on, the concept of minimal term will be defined. For each position in the expression, either an element, a parenthesis, an operator, a function, a space or other, the MINIMAL TERM of such position is the term that comprises such position and that does not comprise any other term which, in turn, comprises said position. For example, in Exhibit 16, the minimal term of the element "$B_1$" is "$(A+C)/D+B_1$", while the minimal term of the operator "$+_2$" is "$A+_2C$".

$$(((A+_2C)/D+B_1)*(F+(E*(A+(B+C)/F))+(G/(H*(H+I)))))*A$$ Exhibit 16

Figure 35:
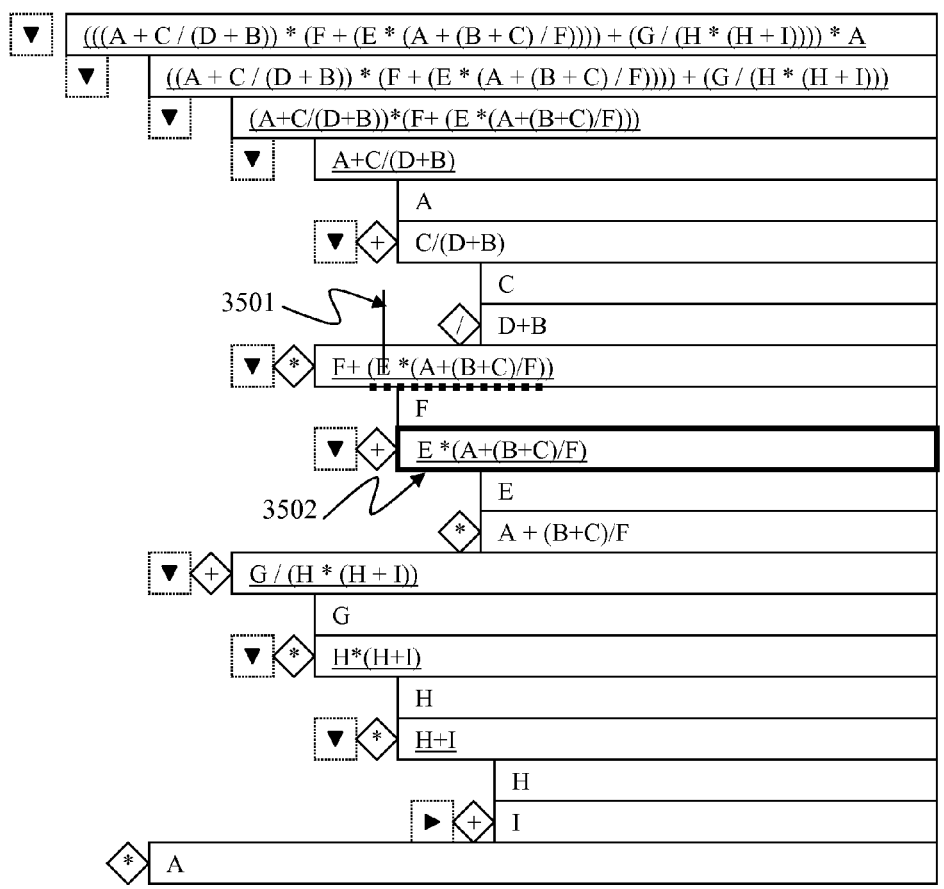
FIG. 35 shows a structure that shows the functionality called 'identification of minimal term'.

Related to this, another optional functionality that can be added to the arboreal representation that is being used is called IDENTIFICATION OF MINIMAL TERM, which is characterized because when the user selects a position of the calculation expression, the system selects the minimal term of said position. For example, the user might select the position 3501 in FIG. 35. The system them might identify and select the minimal term of said position, which is "$E*(A+(B+C)/F)$". Optionally, the system might emphasize the term that was selected, in the place where it has been selected, as shown by the dotted underlining in the Figure. Also, it would optionally find a node that matches said term and would select it, as appears in FIG. 35 in node 3502. This function facilitates for the user to better comprehend the internal structure of the expression.

Figure 36:
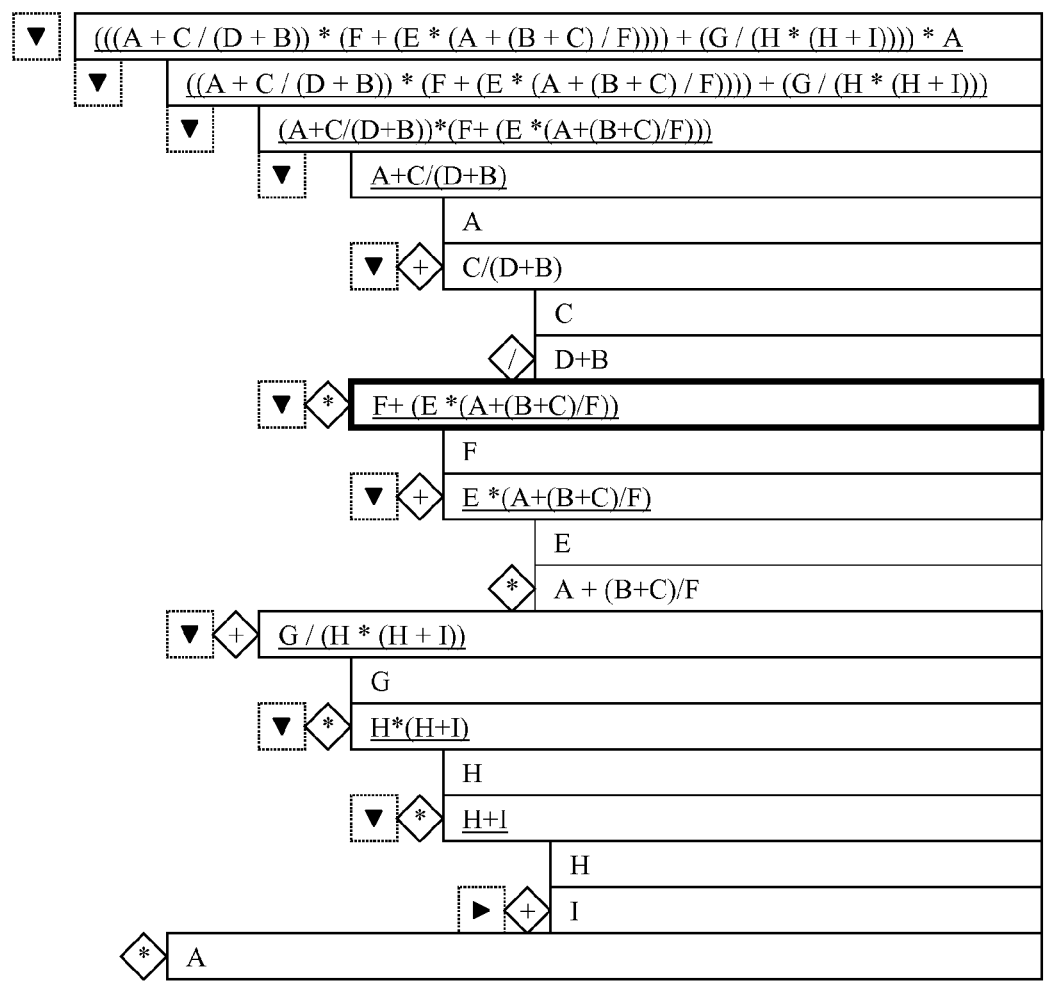
FIG. 36 shows a structure that shows the functionality called 'term ascension'.

Another related optional functionality is TERM ASCENSION. This functionality is characterized because, when requested by the user, the invention selects the parent term of the term that is selected at a given moment. For example, when this functionality is applied to the structure shown in FIG. 35, in a possible embodiment of the invention, the structure shown in FIG. 36 would be obtained. This function also facilitates for the user to better comprehend the structure of the expression.

Implementation of the Invention

The preferred embodiment would be implemented in a computerized system. In particular, it would be created as a complement to other applications, which could be a database application, a spreadsheet, a programming environment or other type of program.

Figure 37:
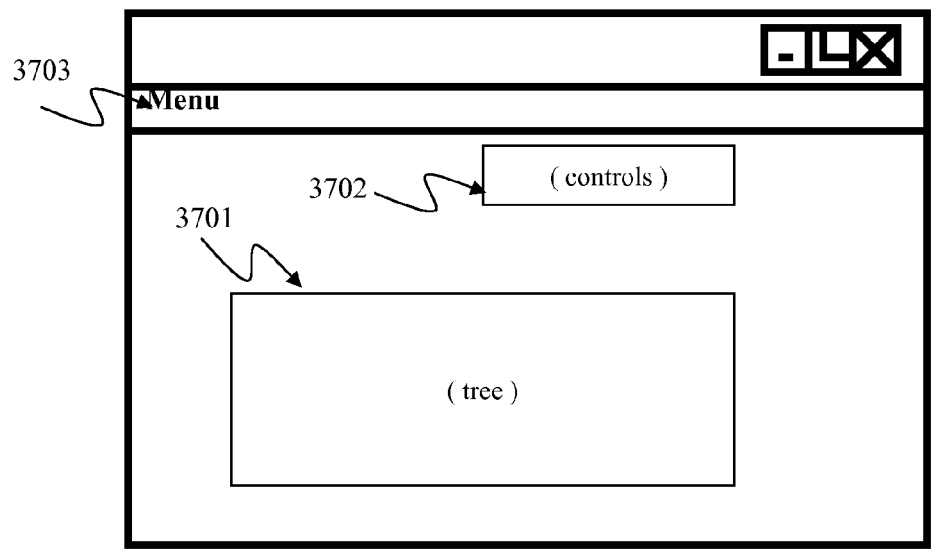
FIG. 37 schematically shows the window of a computer system that might be used to embody the invention.

In the preferred embodiment there exist a window that allows to generate different rows and that contains different controls for combining rows, as shown in FIG. 37. In the Figure, the spot 3701 is intended for the creation of the graphical structure that represents the tree, the spot 3702 is intended for the controls that will be used, and the Menu 3703 will gather the actions that might be applied, which correspond also to the actions that can be applied by the controls.

The computerized functionality can be implemented with a variety of programming environments, such as for example Microsoft Visual Basic®, the controls can be for example of the type Microsoft CommandButton®, and the cells of the arboreal graphical structures can be for example controls of the type Microsoft RichTextbox®. It is also possible to use the Microsoft Treeview® control to create the tower arboreal structure.

In the preferred embodiment, the user can simultaneously select several cells of the arboreal structures, as is customarily done in personal computers, by using the keys "Control" and "Ucase". When a cell is selected, the borders of the cell are marked in thicker line. In the case of the escalator structure, cell selection does not apply.

Figure 38:
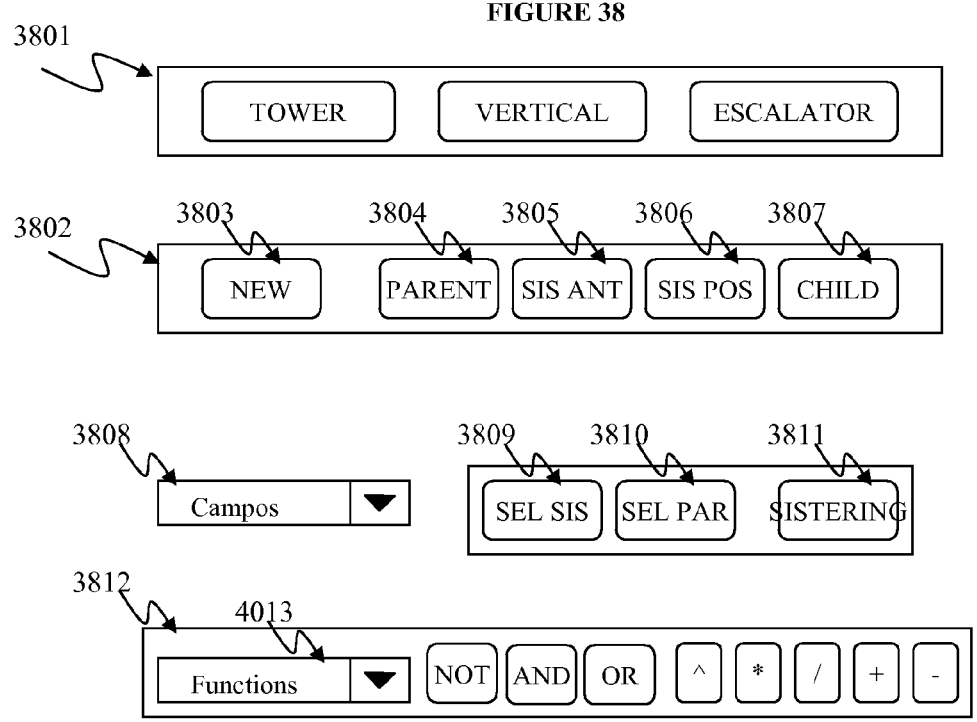
FIG. 38 shows some controls that could be used to embody the invention.

The controls that might exist in the preferred embodiment are shown in FIG. 38. The controls 3801 are used to decide what type of arboreal structure must be shown. When there exists an arboreal structure of a given type, if the user selects a control that corresponds to an arboreal structure of a different type, the expression that was being shown would be shown in the new arboreal structure.

Not all the other controls can be utilized in all the types of arboreal structures, and choosing a particular type of arboreal structure would cause non appropriate controls to become disabled.

Controls 3802 can be used to create new cells. The control 'New' can be applied in any of the cases, for creating a new cell. The cell is always created in the same part of the area. The control Parent 3804 is used for creating new cells that will be parent to the selected cells. The controls Sis Ant 3805 and Sis Pos 3806 are intended for creating cells that are sisters to the selected cell, and the control Child 3807 is intended for creating a child cell.

The control Fields 3808 is visible and active when the user is creating an expression for a database. This control contains the fields of the database.

The controls Sel Sis 3809 and Sel Par 3810 are intended for selecting cells and assign certain characteristics to them. If a cell is selected as sister and another one is selected as parent and the user presses the control Sintering 3811, the cell that was selected as sister becomes a child cell to the cell that was selected as parent.

The controls 3812 are intended for adding functions or operators to the arboreal structure that is being shown. The Figure shows only the most usual operators but it would be possible to create controls for all type of operators. The control 3813 shows the functions that can be used in the particular embodiment.

The form in which different arboreal representations are created is considered to be matter falling within the prior art. In the particular case of the escalator structure, it is very simple to build it using text controls, such as for example the Microsoft Rich Textbox control. The text would be organized in vertical fashion in the window, so that each control contains the calculation expression that is being processed. The following action would be to apply a non visible font color those parts of the expression that do not correspond to the level of embedding that is appropriate.

Figure 39:
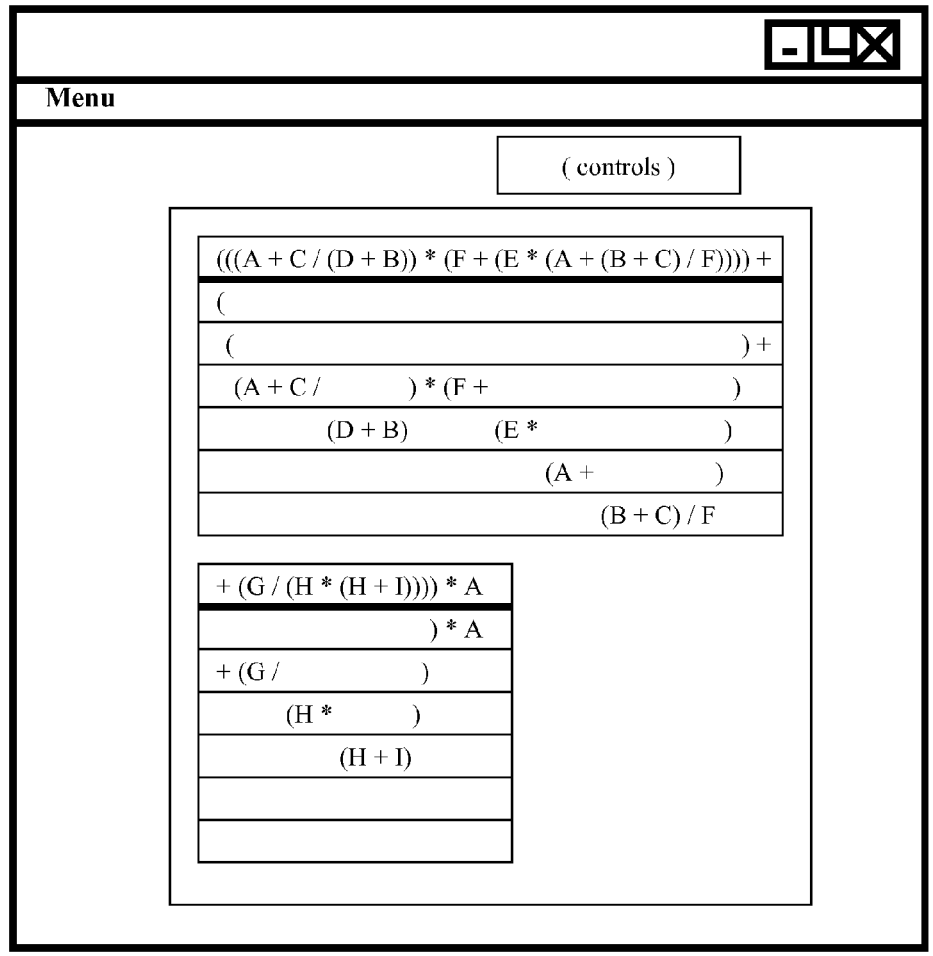
FIG. 39 shows a possible way to fully show a escalator structure for a very long expression.

In those cases in which the arboreal structures do not fit in the screen, there exist several ways to show the whole structure to the user. FIG. 39 shows a way to fully show an escalator structure that is too wide.

In the preferred embodiment there would exist other particular features which are related to the graphical form in which the different arboreal graphical structures are created, but they will not be explained here in order not to complicate the description. In any case, it is considered that they are within the usual practice in computer systems, and therefore they are well known to any person who is experienced in computers and programming.

Exposition Of Other Embodiments

As can be easily observed, there exist a defined direction in the tree graphical representation, which is defined from the root nodes or top nodes to the child nodes or lower nodes. For each type of arboreal graphical structure, the structure could expand along that direction either in one sense or in the opposite sense. For example, a vertical structure could be built in such as way that the root node was in the lower part and the nodes would expand towards the top. The same applies to other arboreal structures.

In general, it is possible to built an undetermined number of embodiments by means of combining the different types of arboreal structures that were presented previously with the different types of characteristics, functionalities and optional features that have been described.

In a possible embodiment, the tower structure would be built with the format of the Microsoft Treeview control, and it would utilize the usual folder icons that are used in the operating system Microsoft Windows.

Figure 40:
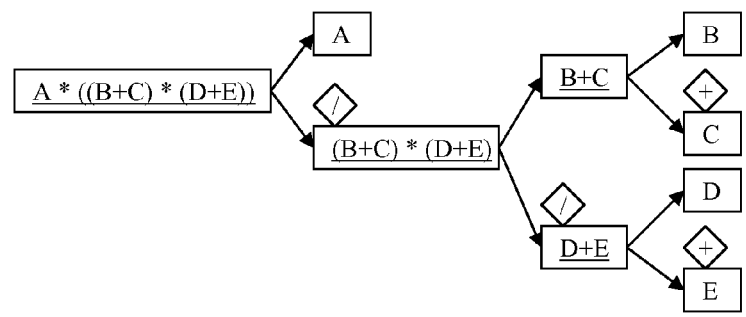
FIG. 40 shows a horizontal structure

In another embodiment, there exist a horizontal structure. The horizontal structure is a graphical representation of a tree, in which the tree expands in horizontal direction, as shown in FIG. 40.

Figure 41:
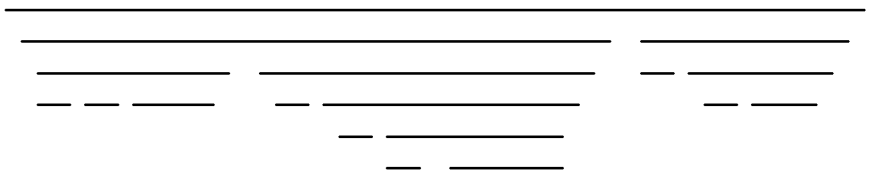
FIG. 41 shows a line structure
Figure 42:
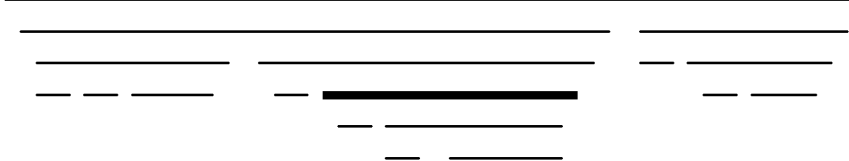
FIG. 42 shows a line structure
Figure 43:
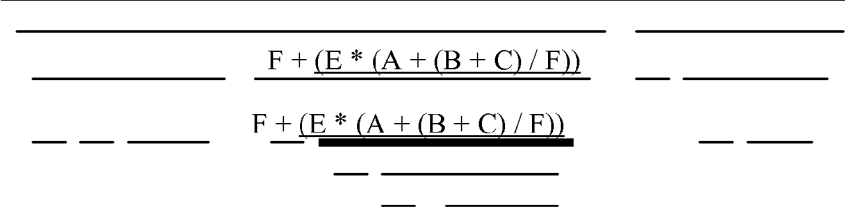
FIG. 43 shows a line structure

In another embodiment, there exists a line structure. A line structure is a graphical representation that is created by lines, as shown in FIG. 41. The line structure allows to emphasize the different terms or nodes in different ways, as shown in FIGS. 42 and 43.

In another embodiment, there would exist a relief structure, as shown in FIGS. 44 and 45 in two different formats.

In another embodiment, the parenthesis are removed from the escalator structure, as shown in FIG. 46.

The invention claimed is:

1. A computerized system for managing calculation expressions, comprising:
   a memory for storing information about said calculation expressions;
   a processor for creating one or more arboreal graphical representations; and
   a display for showing one or more said arboreal graphical representations;
   wherein
   an arboreal graphical representation is an entity that shows a calculation expression in the form of a tree,
   each node of said tree shows a fragment of said calculation expression,
   at least one parent node in said tree has more than two child nodes,
   except optionally for the first node of said child nodes, each one of said child nodes is shown associated to one instance of one operator, wherein said one instance of one operator is associated only to said child node,
   said one instance of one operator is shown graphically adjacent to said content of said node, or is shown inside the content of said node,
   for each of those instances of one operators, said one operator is optionally compound, a compound operator being a combination of other operators,
   the result of linking together strings that correspond to each and every one of all of said child nodes produces an equivalent fragment to the fragment of said calculation expression that is shown in said one parent node, excluding a one instance of one operator that is associated to said parent node in case said parent node is shown associated to one instance of one operator,
   wherein:
      for a child node that is not shown associated to an instance of an operator, said corresponding string is the content of said child node,
      for a child node that is shown associated to an instance of an operator, said operator being shown inside the content of said node, said corresponding string is the content of said child node,
      for a child node that is shown associated to an instance of an operator, said operator being shown adjacent to the content of said node, said corresponding string is the result of linking said instance of one operator with said content of said child node.

2. A system as claimed in claim 1, wherein one of said graphical representations is a TOWER STRUCTURE, wherein said tower structure is characterized by
   the nodes of the tree being arranged in vertical fashion, where each node, except the top one, is located immediately below another node.

3. A system as claimed in claim 1, wherein if said first child node is associated to an instance of an identity operator, said identity operator is optionally shown or not shown in said first child node or in said string that corresponds to said first child node, wherein the add operator in an identity operator in an arithmetic expression.

4. A method for managing calculation expressions on a computerized system, comprising the following steps:
   storing information about said calculation expressions,
   creating one or more arboreal graphical representations,
   showing said one or more arboreal graphical representations to the user,
   wherein
   an arboreal graphical representation is an entity that shows a calculation expression in the form of a tree,
   each node of said tree shows a fragment of said calculation expression,
   at least one parent node in said tree has more than two child nodes,
   except optionally for the first node of said child nodes, each one of said child nodes is shown associated to one instance of one operator, wherein said one instance of one operator is associated only to said child node,
   said one instance of one operator is shown graphically adjacent to said content of said node, or is shown inside the content of said node for each of those instances of one operators, said one operator is optionally compound, a compound operator being a combination of other operators, the result of linking together strings that correspond to each and every one of all of said child nodes produces an equivalent fragment to the fragment of said calculation expression that is shown in said one parent node, excluding a one instance of one operator that is associated to said parent node in case said parent node is shown associated to one instance of one operator, wherein:

for a child node that is not shown associated to an instance of an operator, said corresponding string is the content of said child node, for a child node that is shown associated to an instance of an operator, said operator being shown inside the content of said node, said corresponding string is the content of said child node, for a child node that is shown associated to an instance of an operator, said operator being shown adjacent to the content of said node, said corresponding string is the result of linking said instance of one operator with said content of said child node.

5. A method as claimed in claim 4, further comprising the steps of accepting input from the user, and modifying the structure or the content of said arboreal graphical representation accordingly to said input.

6. A method as claimed in claim 4, wherein one of said graphical representations is a TOWER STRUCTURE, wherein said tower structure is characterized by the nodes of the tree being arranged in vertical fashion, where each node, except the top one, is located immediately below another node.

7. A method as claimed in claim 4, further comprising the step of showing a text or texts next to one more of the nodes of said graphical representation, said text or texts containing descriptive information about the content of said one or more nodes.

8. A method as claimed in claim 4, further comprising the step of converting said calculation expression into other type of entities, said other type of entity being formulae for spreadsheet applications or source code editors, or said other type of entity being search strings for database applications or Internet search engines, or said other type of entity being other type of entity.

9. A method as claimed in claim 4, further comprising the step of showing a text or texts next to one or more of the nodes of said graphical representation, said text or texts containing the value of said expression for said node or nodes.

10. A method as claimed in claim 4, further comprising the step warning the user about a part of said calculation expression that has a specific characteristic, wherein said for step of warning the user comprises one or more of the following plurality of steps:

displaying a text displaying an image changing one or more colors in the tree or in its background blocking editing by the user in other parts of the tree while said part of said calculation expression remains having said specific characteristic.

11. A method as claimed in claim 4, further comprising the steps of detecting whether the situation exists that three or more sister nodes are joined by operators that do not follow the associative property, when said situation exists, warning the user about said circumstance, wherein said operators belong to the same type or belong to different types or operators.

12. A method as claimed in claim 4, wherein if said first child node is associated to an instance of an identity operator, said identity operator is optionally shown or not shown in said first child node or in said string that corresponds to said first child node, wherein the add operator in an identity operator in an arithmetic expression.

13. A method as claimed in claim 4, further comprising the steps of detecting whether the situation exists that three or more sister nodes are joined by operators that have different types when said situation exists, warning the user about said circumstance.

14. A method as claimed in claim 4, further comprising the step of expanding and collapsing nodes in said arboreal graphical structures.

15. A non transitory computer readable medium storing a computer program that, when executed by one or more processors of a computer, allows said one of more processors to perform the following steps:

storing information about said calculation expressions, creating one or more arboreal graphical representations, showing said one or more arboreal graphical representations to the user, wherein an arboreal graphical representation is an entity that shows a calculation expression in the form of a tree, each node of said tree shows a fragment of said calculation expression, at least one parent node in said tree has more than two child nodes, except optionally for the first node of said child nodes, each one of said child nodes is shown associated to one instance of one operator, wherein said one instance of one operator is associated only to said child node, said one instance of one operator is shown graphically adjacent to said content of said node, or is shown inside the content of said node for each of those instances of one operators, said one operator is optionally compound, a compound operator being a combination of other operators, the result of linking together strings that correspond to each and every one of all of said child nodes produces an equivalent fragment to the fragment of said calculation expression that is shown in said one parent node, excluding a one instance of one operator that is associated to said parent node in case said parent node is shown associated to one instance of one operator, wherein:

for a child node that is not shown associated to an instance of an operator, said corresponding string is the content of said child node, for a child node that is shown associated to an instance of an operator, said operator being shown inside the content of said node, said corresponding string is the content of said child node, for a child node that is shown associated to an instance of an operator, said operator being shown adjacent to the content of said node, said corresponding string is the result of linking said instance of one operator with said content of said child node.

16. A non transitory computer readable medium as claimed in claim 15, wherein if said first child node is associated to an instance of an identity operator, said identity operator is optionally shown or not shown in said first child node or in said string that corresponds to said first child node, wherein the add operator in an identity operator in an arithmetic expression.

* * * * *